(12) United States Patent
Nishikawa et al.

(10) Patent No.: US 10,987,775 B2
(45) Date of Patent: Apr. 27, 2021

(54) MACHINING STATE DISPLAY APPARATUS

(71) Applicant: DMG Mori Co., LTD., Nara (JP)

(72) Inventors: Shizuo Nishikawa, Nara (JP); Koji Iiyama, Nara (JP); Hiroki Nakao, Nara (JP)

(73) Assignee: DMG MORI CO., LTD., Nara (JP)

( * ) Notice: Subject to any disclaimer, the term of this patent is extended or adjusted under 35 U.S.C. 154(b) by 281 days.

(21) Appl. No.: 16/095,988

(22) PCT Filed: Mar. 17, 2017

(86) PCT No.: PCT/JP2017/010842
§ 371 (c)(1),
(2) Date: Oct. 24, 2018

(87) PCT Pub. No.: WO2017/208571
PCT Pub. Date: Dec. 7, 2017

(65) Prior Publication Data
US 2019/0134767 A1 May 9, 2019

(30) Foreign Application Priority Data
May 30, 2016 (JP) .............................. JP2016-107575

(51) Int. Cl.
*B23Q 17/12* (2006.01)
*G05B 19/4063* (2006.01)
*B23Q 15/12* (2006.01)

(52) U.S. Cl.
CPC ............. *B23Q 17/12* (2013.01); *B23Q 15/12* (2013.01); *G05B 19/4063* (2013.01)

(58) Field of Classification Search
CPC ........... G05B 2219/36284; G05B 2219/36283; G05B 2219/35285
See application file for complete search history.

(56) References Cited

U.S. PATENT DOCUMENTS

| 5,831,407 A | * | 11/1998 | Ouchi ................ G05B 19/4068 318/567 |
| 2003/0045964 A1 | | 3/2003 | Lottgen et al. |
| 2019/0121314 A1 | * | 4/2019 | Fujii ................ G05B 19/41875 |

FOREIGN PATENT DOCUMENTS

| DE | 102013211860 A1 | 12/2014 |
| EP | 2987396 A1 | 2/2016 |

(Continued)

OTHER PUBLICATIONS

European Search Report related to Application No. EP 17806133.9 dated Feb. 13, 2020.

*Primary Examiner* — Jennifer E Simmons
(74) *Attorney, Agent, or Firm* — von Briesen & Roper, s.c.

(57) ABSTRACT

A machining state display apparatus includes an achievement degree data storage (9) storing machining condition data relating to each of sets of machining conditions and achievement degree data relating to degrees of achievement of evaluation items to be obtained in machining under each of the sets of machining conditions, with the machining condition data and the achievement degree data being associated with each other, a display part (2) displaying a set of machining conditions and degrees of achievement of the evaluation items corresponding thereto on a display (5), and an input part (6) inputting a signal for selecting one from the evaluation items and a required degree of achievement for the selected evaluation item. The display part (2) recognizes, based on the selected evaluation item and the required degree of achievement, a set of machining conditions corresponding to the required degree of achievement for the selected evaluation item as well as the degrees of achievement of other evaluation items to be obtained under the set of machining conditions by referring to the achievement degree data storage (9), and displays the recognized degrees (Continued)

of achievement on evaluation-item basis and displays the recognized set of machining conditions.

20 Claims, 8 Drawing Sheets

(56) References Cited

FOREIGN PATENT DOCUMENTS

| | | |
|---|---|---|
| JP | H10301745 A | 11/1998 |
| JP | 2001005507 A | 1/2001 |
| JP | 2004280267 A | 10/2004 |
| JP | 2007069330 A | 3/2007 |
| JP | 2012200848 A | 10/2012 |

* cited by examiner

FIG. 2

| Machining Conditions | | | | Evaluation Item / Degree of Achievement | | | | | | |
|---|---|---|---|---|---|---|---|---|---|---|
| Cutting speed | Feed rate | Width of cut | Depth of cut | Machining time | Surface roughness | Tool life | Cutting efficiency | Residual stress | Spindle motor load | Feed motor load |
| max | max | max | max | 100 | 40 | 30 | 70 | 0 | 0 | 0 |
| max | max | max | middle | 96 | 40 | 28 | 65 | 2 | 2 | 0 |
| max | max | max | min | 94 | 45 | 26 | 65 | 4 | 4 | 4 |
| max | max | middle | max | 96 | 42 | 28 | 66 | 4 | 2 | 4 |
| max | max | middle | middle | 94 | 42 | 25 | 65 | 6 | 4 | 4 |
| max | max | middle | min | 90 | 45 | 22 | 60 | 6 | 8 | 6 |

MACHINING STATE DISPLAY APPARATUS

TECHNICAL FIELD

The present invention relates to an apparatus for displaying a state of machining which is practicable in a machine tool, more particularly, relates to a machining state display apparatus displaying a degree of achievement of each of a plurality of predetermined machining-related evaluation items within a range between an attainable maximum value and an attainable minimum value of the evaluation item, with the degrees of achievement associated with each other.

BACKGROUND ART

In the field of machining using a machine tool, machining an object to be machined (workpiece) efficiently and reducing machining costs have been pursued, which are permanent issues. At the same time, machining accuracy required in machining becomes higher day by day as technology is advanced. Therefore, in machining a workpiece by using a machine tool, it is necessary to comprehensively consider machining efficiency, machining costs, and machining accuracy to set machining conditions which provide preferable machining efficiency, machining costs, and machining accuracy.

Under such background, attention has been focused on regenerative chatter that is one of elements influencing machining accuracy; there has been known a display apparatus which is configured to display, on a screen, a stability lobe representing a correlation between spindle rotation speed for rotating a tool or a workpiece and limit depth of cut of the tool above which regenerative chatter occurs (see Patent Literature 1 listed below).

With this display apparatus, because the stability lobe representing the correlation between the spindle rotation speed and the limit depth of cut of the tool above which regenerative chatter occurs is displayed on a screen, the operator can instantaneously, visually recognize a relationship between the spindle rotation speed and depth of cut of the tool which produces no regenerative chatter; therefore, the operator can appropriately set machining conditions which produce no regenerative chatter and provide a high machining efficiency.

For example, the operator can set the highest spindle rotation speed and largest depth of cut available for cutting within an area where no regenerative chatter occurs, taking into account cutting resistance and the like based on his experiential knowledge.

Thus, according to this conventional display apparatus, the operator can set highly efficient machining conditions within a range where no regenerative chatter occurs, based on the stability lobe displayed on the display apparatus.

CITATION LIST

Patent Literature

[Patent Literature 1] Japanese Unexamined Patent Application Publication No. 2012-200848

SUMMARY OF INVENTION

Technical Problem

By the way, in order to set preferable machining conditions, as described above, it is necessary to comprehensively consider elements related to machining efficiency, machining costs, and machining accuracy.

However, in the above-described conventional display apparatus, only the stability lobe representing the correlation between the spindle rotation speed and the limit depth of cut of the tool above which regenerative chatter occurs is displayed; therefore, there is a problem that evaluation of elements other than regenerative chatter which are related to machining efficiency, machining costs, and machining accuracy has no choice but to depend on the operator's experiential knowledge.

However, machining efficiency, machining costs, and machining accuracy are in a so-called "antinomy" relationship, and actually operators do not have sufficient knowledge about them. For example, in the case of using a milling cutter, improvement of machining efficiency, that is, shortening of machining time can be achieved by increasing width of cut and depth of cut of the milling cutter and increasing tool rotation speed and tool feed rate. However, such an approach increases power consumption and shortens tool life, which will be factors of increase of machining costs. Further, the increase of width of cut and depth of cut and the increase of feed rate will be factors of deterioration of machining accuracy.

Thus, machining-related evaluation items which are related to machining efficiency, machining costs, and machining accuracy (for example, machining time, machining accuracy, and tool life) are in an "antinomy" relationship, and their mutual relationship is very complicated. Therefore, actually ordinary operators who have no skilled knowledge do not have accurate knowledge about their mutual relationship.

Accordingly, if it is possible to display the mutual relationship between the machining-related evaluation items (for example, machining time, machining accuracy, and tool life) related to machining efficiency, machining costs, and machining accuracy, even an ordinary operator can easily recognize the mutual relationship, which is convenient.

Further, if, by recognizing the mutual relationship between the machining-related evaluation items related to machining efficiency, machining costs, and machining accuracy, the operator can set machining conditions taking into account the mutual relationship and adjust the machining conditions. Further, if such machining conditions corresponding to the mutual relationship between the evaluation items are displayed, the operator can easily recognize preferable machining conditions which comprehensively take into account machining efficiency, machining costs, and machining accuracy.

The present invention has been achieved in view of the above-described circumstances, and an object thereof is to provide a machining state display apparatus which is configured to display a degree of achievement of each of a plurality of predetermined machining-related evaluation items within a range between an attainable maximum value and an attainable minimum value of the evaluation item, with the degrees of achievement associated with each other.

Solution to Problem

The present invention, for solving the above-described problem, relates to a machining state display apparatus, including:

an achievement degree data storage storing machining condition data relating to each of a plurality of predetermined sets of machining conditions and achievement degree data relating to degrees of achievement of a plurality of predetermined machining-related evaluation items to be obtained in machining under each of the plurality of sets of machining conditions with the machining condition data and the achievement degree data associated with each other, the achievement degree data indicating the degree of achievement of each of the evaluation items within a range determined by attainable maximum and minimum values of the evaluation item;

a display part having a display and displaying, on the display, a set of machining conditions and the degrees of achievement of the evaluation items corresponding to the set of machining conditions by referring to the machining condition data and achievement degree data stored in the achievement degree data storage; and an input part inputting a selection signal for selecting one from the plurality of evaluation items and a required degree of achievement for the selected evaluation item, the display part being further configured to, when the selection signal and the required degree of achievement are input from the input part, recognize, based on the selected evaluation item and the required degree of achievement, a set of machining conditions corresponding to the required degree of achievement for the selected evaluation item as well as the degrees of achievement of other evaluation items to be obtained under the set of machining conditions by referring to the achievement degree data and machining condition data stored in the achievement degree data storage, and display the degree of achievement of the input evaluation item and the recognized degrees of achievement of the other evaluation items on evaluation-item basis and display the recognized set of machining conditions.

With this machining state display apparatus, when an operator inputs a selection signal for selecting one evaluation item, and a required degree of achievement for the selected evaluation item through the input part, the display part recognizes, based on the input evaluation item and required degree of achievement therefor, a set of machining conditions corresponding to the required degree of achievement for the evaluation item as well as the degrees of achievement of other evaluation items obtained to be under the set of machining conditions by referring to the achievement degree data and machining condition data stored in the achievement degree data storage, and displays the degree of achievement of the input evaluation item and the recognized degrees of achievement of the other evaluation items on evaluation-item basis and displays the recognized set of machining conditions.

Note that, as for the evaluation items, for example, three or more items can be selected from among "machining time", "surface roughness", "tool life", "cutting efficiency (=cutting volume per unit of power)", "degree of residual stress", "spindle motor load", "feed motor load", and so on; however, the present invention is not limited thereto. As for the above-mentioned items, "machining time" and "cutting efficiency" are factors influencing machining efficiency, "tool life", "spindle motor load", and "feed motor load" are factors influencing machining costs, and "surface roughness" and "degree of residual stress" are factors influencing machining accuracy. Further, machining costs are influenced also by machining efficiency.

The degree of achievement of each evaluation item, as described above, expresses an achievement level of the evaluation item within a range determined by attainable maximum and minimum values of the evaluation item. For example, in a case where the degree of achievement for the maximum value and the degree of achievement for the minimum value are set to "100" and "0", respectively, the degree of achievement for the middle achievement level between the maximum and minimum values is "50".

Further, the set of machining conditions depends on the mode of machining. For example, in the case of milling, the set of machining conditions contains "depth of cut [mm]", "width of cut [mm]", "feed rate [m/min]", and "cutting speed [m/min]"; in the case of turning, the set of machining conditions contains "depth of cut [mm]", "feed rate [mm/rev]", and "cutting speed [m/min]"; and in the case of drilling, the set of machining conditions contains "feed rate [m/min]" and "cutting speed [m/min]".

Thus, with this machining state display apparatus, by inputting, for example, an evaluation item to which he pays attention and a required degree of achievement for the evaluation item, the operator can recognize the degree of achievement of the evaluation item as well as the degrees of achievement of the other evaluation items corresponding thereto; therefore, the operator can easily recognize a relationship between the evaluation items and easily recognize a set of machining conditions which provides such degrees of achievement.

Further, by adjusting the required degree of achievement to be input through the input part, the operator can adjust the degrees of achievement of the evaluation items; therefore, the operator can easily recognize, for example, a set of machining conditions under which the degrees of achievement of the evaluation items are well-balanced, or a set of machining conditions under which the degrees of achievement of the evaluation items are in his desired state. Further, because, as described above, the evaluation items are related to machining efficiency, machining costs, and machining accuracy, adjusting the degrees of achievement of the evaluation items allows the operator to obtain a preferable set of machining conditions which comprehensively takes into account machining efficiency, machining costs, and machining accuracy.

In this machining state display apparatus, the display part may be configured to, in a case where, as a result of referring to the achievement degree data stored in the achievement degree data storage, there are two or more sets of machining conditions corresponding to the required degree of achievement for the selected evaluation item, recognize an optimum set of machining conditions under which the degree of achievement of a high-priority evaluation item of the other evaluation items is greatest, the high-priority evaluation item being previously determined in relation to the selected evaluation item, subsequently, recognize the degrees of achievement of the other evaluation items to be obtained under the optimum set of machining conditions, and display the degree of achievement of the input evaluation item and the recognized degrees of achievement of the other evaluation items on evaluation-item basis and display the recognized optimum set of machining conditions.

With this machining state display apparatus, in a case where there are two or more sets of machining conditions corresponding to the required degree of achievement for the selected evaluation item, the display part recognizes an optimum set of machining conditions under which the degree of achievement of a high-priority evaluation item of the other evaluation items is greatest, and displays the recognized set of machining conditions and the degrees of achievement of the evaluation items to be obtained under the recognized set of machining conditions, the high-priority evaluation item being previously determined in relation to the selected evaluation item. Therefore, even when there are two or more sets of machining conditions corresponding to the required degree of achievement for the selected evaluation item, the degrees of achievement of the evaluation items in an optimum state can be recognized and a set of machining conditions corresponding thereto can be recognized.

Further, in the machining state display apparatus, the display part may be configured to display the degree of achievement of each of the evaluation items by means of figures, the figures consisting of an axial figure having a length corresponding to the range determined by the maximum and minimum values of the evaluation item, and an index figure arranged on the axial figure at a length position corresponding to a proportion corresponding to the degree of achievement. With this machining state display apparatus, because the degree of achievement of each evaluation item is displayed by means of the figures consisting of the axial figure and the index figure, the operator can instantaneously and intuitively recognize the degrees of achievement of the evaluation items.

Further, the machining state display apparatus may be configured such that:

the display part is configured to display the degree of achievement of each of the evaluation items by means of figures, the figures including an axial figure having a length corresponding to the range determined by the maximum and minimum values of the evaluation item, and an index figure arranged on the axial figure at a length position corresponding to a proportion corresponding to the degree of achievement; and the display part is further configured to, in a case where, as a result of referring to the achievement degree data stored in the achievement degree data storage, there are two or more sets of machining conditions corresponding to the required degree of achievement for the selected evaluation item, with respect to a non-target degree of achievement other than the degrees of achievement corresponding to the index figures of the degrees of achievement of the evaluation items to be obtained under the two or more sets of machining conditions, display a regional figure arranged on the axial figure, the regional figure including a length position corresponding to a proportion corresponding to the non-target degree of achievement and connecting to the index figure.

With this machining state display apparatus, in a case where there are two or more sets of machining conditions corresponding to the required degree of achievement for the selected evaluation item, because the degrees of achievement of each evaluation item to be obtained under the sets of machining conditions are displayed as the index figure and the regional figure connecting thereto, the operator can recognize, with respect to each of the evaluation items, the degree of achievement corresponding to the index figure as well as another attainable degree of achievement. Further, obtaining such recognition allows the operator to easily obtain a set of machining conditions under which the degrees of achievement of the evaluation items are in a preferable state, that is, a preferable set of machining conditions which comprehensively takes into account machining efficiency, machining costs, and machining accuracy.

Further, the machining state display apparatus may be configured such that:

the display part is configured to display the degree of achievement of each of the evaluation items by means of figures, the figures including an axial figure having a length corresponding to the range determined by the maximum and minimum values of the evaluation item, and an index figure arranged on the axial figure at a length position corresponding to a proportion corresponding to the degree of achievement; and the display part is further configured to, in a case where, as a result of referring to the achievement degree data stored in the achievement degree data storage, the degree of achievement of still another evaluation item different from the high-priority evaluation item is greater under a different set of machining conditions from the optimum set of machining conditions than under the optimum set of machining conditions, with respect to the still another evaluation item, display a figure representing the degree of achievement to be obtained under the different set of machining conditions and a figure representing the degree of achievement to be obtained under the optimum set of machining conditions with these figures associated with each other.

With this machining state display apparatus, in a case where the degree of achievement of still another evaluation item different from the high-priority evaluation item is greater under a different set of machining conditions from the optimum set of machining conditions than under the optimum set of machining conditions, with respect to the still another evaluation item, a figure representing the degree of achievement to be obtained under the different set of machining conditions and a figure representing the degree of achievement to be obtained under the optimum set of machining conditions are displayed in association with each other. Therefore, by referring to these figures, the operator can easily recognize not only the set of machining conditions prioritizing the predetermined high-priority evaluation item, but also whether another preferable set of machining conditions exits; therefore, the operator can obtain a more preferable set of machining conditions.

Further, the machining state display apparatus may be configured such that:

the input part is configured to be able to input a selection signal for selecting one from the index figures for the evaluation items displayed on the display and input a sliding signal for sliding the selected index figure in a longitudinal direction of the axial figure corresponding thereto; and the display part is configured to, when the selection signal and the sliding signal are input from the input part, recognize the evaluation item corresponding to the selection signal and slide the index figure displayed on the display in accordance with the sliding signal, and recognize a required degree of achievement based on a position at which the index figure is stopped.

With this machining state display apparatus, a selection signal is input by selecting one from the index figures for the evaluation items displayed on the display, and a required degree of achievement is input by sliding the selected index figure in the longitudinal direction of the axial figure corresponding thereto. Therefore, the operator can easily adjust the required degree of achievement to be input and easily adjust the degrees of achievement of the evaluation items.

Further, the machining state display apparatus may be configured such that:

the machining state display apparatus further comprises a stability lobe data storage storing stability lobe data relating to regenerative chatter of a tool in a correlation between relative rotation speed between the tool and an object to be machined and cutting amount of the tool; and the display part is configured to, based on the stability lobe data stored in the stability lobe data storage, examine whether the set of machining conditions corresponding to the required degree of achievement falls within a stable area limited by the stability lobe, in a case where the set of machining conditions corresponding to the required degree of achievement falls within the stable area, display the set of machining conditions and the degrees of achievement of the evaluation items to be obtained under the set of machining conditions, in a case where the set of machining conditions corresponding to the required degree of achievement does not fall within the stable area, select a set of machining conditions falling within the stable area and recognize the degrees of achievement of the evaluation items corresponding to the selected set of machining conditions by referring to the data stored in the achievement degree data storage, and display the selected set of machining conditions and the recognized degrees of achievement of the evaluation items.

With this machining state display apparatus, in a case where the set of machining conditions corresponding to the required degree of achievement for the selected evaluation item does not fall within the stable area limited by the stability lobe, a set of machining conditions falling within the stable area is selected based on the data stored in the achievement degree data storage, and the selected set of machining conditions and the degrees of achievement of the evaluation items corresponding to the selected set of machining conditions are displayed. Therefore, the operator can obtain a set of machining conditions which causes no regenerative chatter, without being required to perform a special operation.

Further, the machining state display apparatus may be configured such that:

the machining state display apparatus further comprises a stability lobe data storage storing stability lobe data relating to regenerative chatter of a tool in a correlation between relative rotation speed between the tool and an object to be machined and cutting amount of the tool; and the display part is configured to, based on the stability lobe data stored in the stability lobe data storage and the data stored in the achievement degree data storage, recognize an unstable set of machining conditions falling within an unstable area limited by the stability lobe, based on the recognized unstable set of machining conditions, with respect to each of the evaluation items, examine whether an inapplicable degree of achievement exists, and in a case where an inapplicable degree of achievement exists, display the inapplicable degree of achievement with respect to the evaluation item corresponding thereto.

With this machining state display apparatus, an unstable set of machining conditions falling within the unstable area limited by the stability lobe is recognized based on the data stored in the achievement degree data storage, and with respect to each of the evaluation items, whether an inapplicable degree of achievement exists is examined based on the recognized unstable set of machining conditions. In the case where an inapplicable degree of achievement exists, the inapplicable degree of achievement is displayed with respect to the evaluation item corresponding thereto. The operator can easily recognize whether the displayed degree of achievement of each evaluation item is inapplicable, and under such recognition, the operator can select a set of machining conditions which does not provide inapplicable degrees of achievement for the evaluation items, by adjusting the required degree of achievement for the selected evaluation item as appropriate.

Further, the machining state display apparatus may be configured such that:

the machining state display apparatus further comprises a stability lobe data storage storing stability lobe data relating to regenerative chatter of a tool in a relationship between relative rotation speed between the tool and an object to be machined and cutting amount of the tool; and the display part is configured to, based on the stability lobe data stored in the stability lobe data storage and the data stored in the achievement degree data storage, recognize an unstable set of machining conditions falling within an unstable area limited by the stability lobe, based on the recognized unstable set of machining conditions, with respect to each of the evaluation items, examine whether an inapplicable degree of achievement exists, and in a case where an inapplicable degree of achievement exists, display a figure corresponding to the inapplicable degree of achievement, with the figure arranged on the axial figure for the evaluation item corresponding thereto.

With this machining state display apparatus, an unstable set of machining conditions falling within the unstable area limited by the stability lobe is recognized based on the data stored in the achievement degree data storage, and with respect to each of the evaluation items, whether an inapplicable degree of achievement exists is examined based on the recognized unstable set of machining conditions. In the case where an inapplicable degree of achievement exists, a figure corresponding to the inapplicable degree of achievement is displayed with respect to the evaluation item corresponding thereto.

Therefore, also with this machining state display apparatus, the operator can easily recognize whether the displayed degree of achievement of each evaluation item is inapplicable, and under such recognition, the operator can select a set of machining conditions which does not provide inapplicable degrees of achievement for the evaluation items, by adjusting the required degree of achievement for the selected evaluation item as appropriate.

Advantageous Effects of Invention

As described above, with the machining state display apparatus according to the present invention, for example, by inputting an evaluation item to which he pays attention and a required degree of achievement for the evaluation item, the operator can recognize the degree of achievement of the evaluation item as well as the degrees of achievement of other evaluation items corresponding thereto. Therefore, the operator can easily recognize a relationship between the evaluation items and easily recognize a set of machining conditions which provides such degrees of achievement.

Further, by adjusting the required degree of achievement to be input through the input part, the operator can adjust the degrees of achievement of the evaluation items; therefore, the operator can easily recognize, for example, a set of machining conditions under which the degrees of achievement of the evaluation items are well-balanced, or a set of machining conditions under which the degrees of achievement of the evaluation items are in his desired state. Further, as described above, because the evaluation items are related to machining efficiency, machining costs, and machining accuracy, by adjusting the degrees of achievement of the evaluation items, the operator can obtain a preferable set of machining conditions which comprehensively takes into account machining efficiency, machining costs, and machining accuracy.

BRIEF DESCRIPTION OF DRAWINGS

FIG. 2 is an illustration for explaining data stored in an achievement degree data storage in the embodiment;

DESCRIPTION OF EMBODIMENTS

Figure 1:
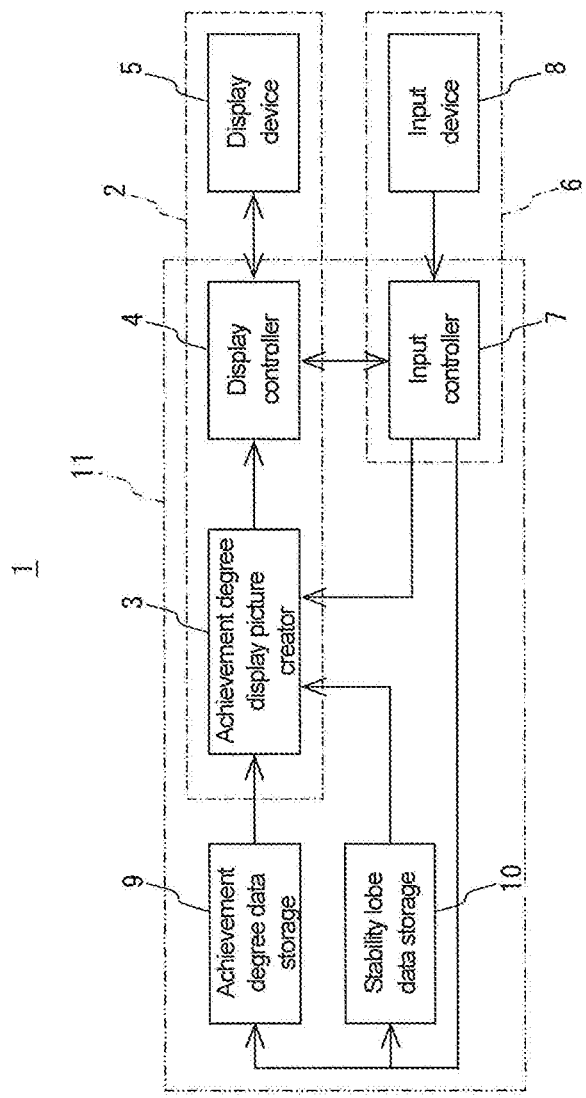
FIG. 1 is a block diagram showing a schematic configuration of a machining state display apparatus according to an embodiment of the present invention.

Hereinafter, a specific embodiment of the present invention will be described with reference to the drawings. FIG. 1 is a block diagram showing a machining state display apparatus according to the embodiment.

As shown in FIG. 1, the machining state display apparatus 1 according to this embodiment includes a computing device 11, a display device 5, and an input device 8, the computing device 11 having an achievement degree display picture creator 3, a display controller 4, an input controller 7, an achievement degree data storage 9, and a stability lobe data storage 10. The computing device 11 is composed of a computer including a CPU, an RAM, an ROM, and so on; the functions of the achievement degree display picture creator 3, display controller 4, and input controller 7 are implemented by a computer program so that they execute processings as described below. Further, the achievement degree data storage 9 and the stability lobe data storage 10 are each composed of an appropriate storage medium such as an RAM.

Note that, in this embodiment, the achievement degree display picture creator 3, the display controller 4, and the display device 5 constitute a display part 2, and the input controller 7 and the input device 8 constitute an input part 6. Further, the computing device 11 may be incorporated in a controller of an appropriate machine tool. Similarly, the display device 5 may be composed of a display that is provided on an operation panel of the machine tool, and the input device 8 may be composed of a keyboard or the like that is also provided on the operation panel of the machine tool.

The display controller 4 and the input controller 7 constitute a so-called user interface, the display controller 4 controlling display of a picture on the display device 5, the input controller 7 controlling transmission of data and signals input from the input device 8.

For example, the display controller 4 displays an achievement degree display picture created by the achievement degree display picture creator 3 on the display device 5. Further, upon receiving an operation signal input from the input device 8 via the input controller 7, the display controller 4 scrolls a displayed picture, moves a pointer in a displayed picture, or moves an image in a displayed picture.

Further, the input controller 7 stores achievement degree data and the like, which are input from the input device 8, into the achievement degree data storage 9, and stores stability lobe data, which is also input from the input device 8, into the stability lobe data storage 10. Further, as described above, the input controller 7 transmits the operation signal input from the input device 8 to the display controller 4. Further, for example, upon receiving a determination signal input from the input device 8, the input controller 7 recognizes the position of the pointer or the position of a specified image in a picture displayed on the display device 5 via the display controller 4, and transmits an input signal corresponding to the recognized position to the achievement degree display picture creator 3.

Note that the display device 5 and the input device 8 may be composed of a touch panel or the like that is also provided on the operation panel of the machine tool.

The achievement degree data storage 9 is a functional unit that stores, with respect to predetermined tool and workpiece, data relating to each of a plurality of predetermined sets of machining conditions and achievement degree data relating to degrees of achievement of evaluation items in machining under each of the sets of machining conditions, the machining condition data and the achievement degree data associated with each other. Specifically, these data are stored in the form of a data table as shown in FIG. 2, for example.

The set of machining conditions depends on tool type (mode of machining). For example, in the case of milling, the set of machining conditions contains "depth of cut [mm]", "width of cut [mm]", "feed rate [m/min]", and "cutting speed [m/min]"; in the case of turning, the set of machining conditions contains "depth of cut [mm]", "feed rate [mm/rev]", and "cutting speed [m/min]"; and in the case of drilling, the set of machining conditions contains "feed rate [m/min]" and "cutting speed [m/min]".

The example shown in FIG. 2 shows sets of machining conditions for milling. A maximum value (max) and a minimum value (min), which are recommended by the manufacturer of the tool, and a middle value (middle) between the maximum and minimum values are used with respect to each machining condition, and 81 sets of machining conditions are set by combining the three values in order. Note that, in this example, the terms "maximum value (max)", "minimum value (min)", and "middle value (middle)" are used for the purpose of conceptual explanation; however, actually the machining conditions are set with specific numerals (the same applies to the following description).

Further, trial machining is performed with the corresponding tool and workpiece under each of the sets of machining conditions, and evaluation items "machining time", "surface roughness", "tool life", "cutting efficiency", "residual stress", "spindle motor load", and "feed motor load" are actually measured. Note that the evaluation item "machining time" is an amount of time required for machining a predetermined volume of the workpiece, the evaluation item "surface roughness" is surface roughness of the workpiece having been machined by the predetermined volume, and the evaluation item "residual stress" is evaluated with surface hardness of the workpiece having been machined by the predetermined volume. Further, the evaluation item "spindle motor load" is a mean load acting on a spindle motor during the machining of the predetermined volume, and the evaluation item "feed motor load" is a mean load acting on a feed motor during the machining of the predetermined volume. Furthermore, the evaluation item "cutting efficiency" is a cutting volume per unit of power, which can be calculated by measuring integral power consumption of the spindle motor and the feed motor during the machining of the predetermined volume and dividing the predetermined volume by the measured integral power consumption. Furthermore, the evaluation item "tool life" is a machining time taken until tool wear amount reaches a predetermined amount.

The degree of achievement of each evaluation item under each set of machining conditions expresses at what level (achievement level) the value of the evaluation item under the set of machining conditions lies within a range determined by the largest and smallest values of all the actually measured data for the evaluation item. For example, in a case where the degree of achievement for the largest value is set to "100" and the degree of achievement for the smallest value is set to "0", when the exact middle value between the largest and smallest values is obtained under a certain set of machining conditions, the degree of achievement (achievement level) under the set of machining conditions is "50".

Thus, with respect to each of the evaluation items, the degree of achievement under each of the sets of machining conditions is calculated based on the actually measured values of the evaluation item that are obtained through the above-described trial machining, and the calculated degree of achievement and the corresponding set of machining conditions are associated with each other and stored into the achievement degree data storage 9. Note that the machining condition data and the achievement degree data each differ in accordance with tool type, tool material, and workpiece material. Therefore, the data are obtained for each tool type, each tool material, and each workpiece material through the above-described trial machining, and the obtained data are stored in the achievement degree data storage 9 with respect to each tool type, each tool material, and each workpiece material.

Figure 3:
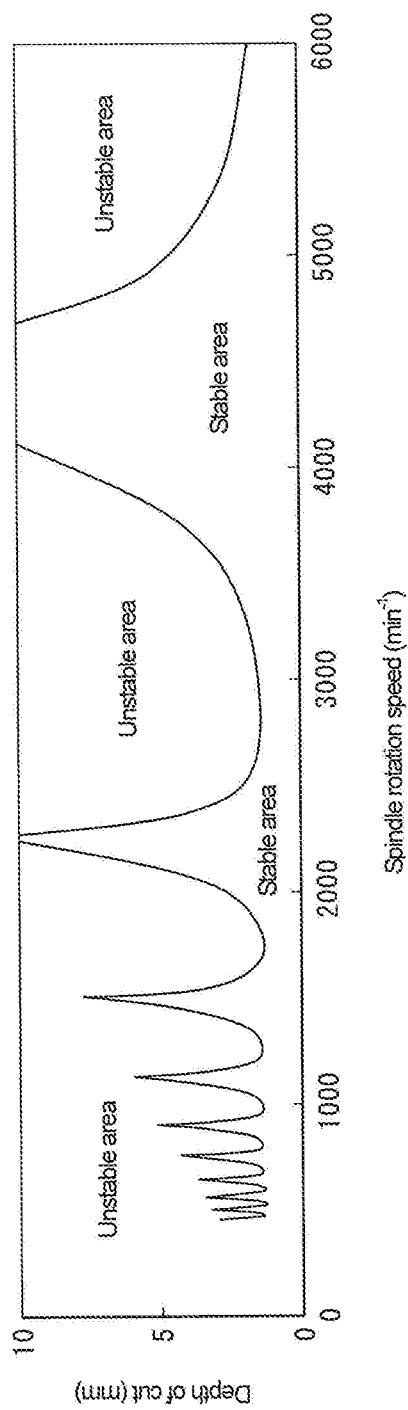
FIG. 3 is an illustration for explaining data stored in a stability lobe data storage in the embodiment.

The stability lobe data storage 10 is a functional unit that stores data relating to a stability lobe as shown in FIG. 3, the stability limit lobe data being input via the input device 8 and the input controller 7 to be stored in the stability lobe data storage 10.

Figure 8:
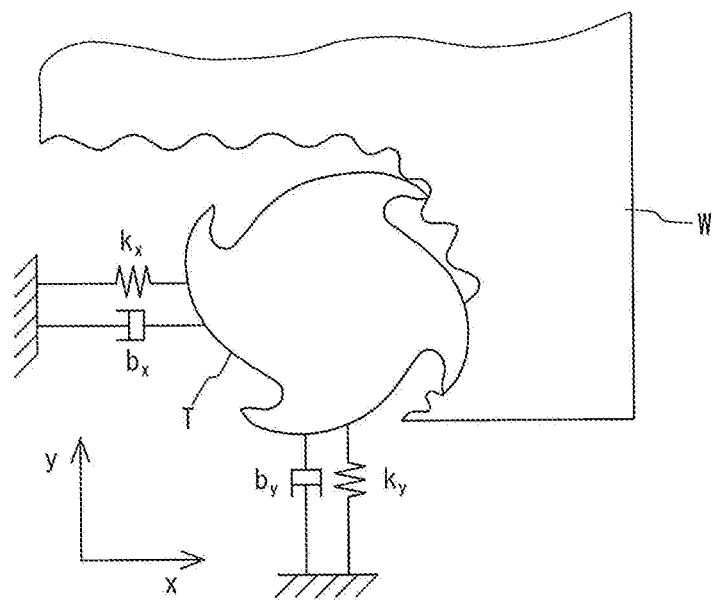
FIG. 8 is an illustration showing a cutting model of a system having two degrees of freedom.

The stability lobe represents a correlation between spindle rotation speed and limit depth of cut (cutting amount) of tool above which regenerative chatter occurs. First, the basic principles for creating such a stability lobe are explained. The model shown in FIG. 8 is a physical model of a system having two degrees of freedom, which is configured to move a tool T and a workpiece W relative to each other in two feed axis directions: an x-axis direction (feed direction) and a y-axis direction (cutting direction). Based on this model, conditions which cause regenerative chatter vibration are obtained by means of the analysis method devised by Y. Altintas.

In this model, the equations of motion for the tool T are represented by the following equations 1 and 2.

$$x''+2\zeta_x\omega_x x'+\omega_x^2 x = F_x/m_x \quad \text{(Equation 1)}$$

$$y''+2\zeta_y\omega_y y'+\omega_y^2 y = F_y/m_y \quad \text{(Equation 2)}$$

In these equations, $\omega_x$ is a natural frequency [rad/sec] in the x-axis direction of the tool T, $\omega_y$ is a natural frequency [rad/sec] in the y-axis direction of the tool T, $\zeta_x$ is a damping ratio [%] in the x-axis direction, and $\zeta_y$ is a damping ratio [%] in the y-axis direction. Further, $m_x$ is an equivalent mass [kg] in the x-axis direction, $m_y$ is an equivalent mass [kg] in the y-axis direction, $F_x$ is a cutting force [N] in the x-axis direction applied to the tool T, and $F_y$ is a cutting force [N] in the y-axis direction applied to the tool T. Furthermore, x" and y" each represent a second-order derivative with respect to time and x' and y' each represent a first-order derivative with respect to time.

The cutting forces $F_x$ and $F_y$ can be calculated by the following equations 3 and 4, respectively:

$$F_x = -K_t a_p h(\varphi)\cos(\varphi) - K_r K_t a_p h(\varphi)\sin(\varphi); \text{ and} \quad \text{(Equation 3)}$$

$$F_y = +K_t a_p h(\varphi)\sin(\varphi) - K_r K_t a_p h(\varphi)\cos(\varphi). \quad \text{(Equation 4)}$$

In these equations, $h(\varphi)$ [m²] is a thickness with which an cutting edge cuts the workpiece W, $a_p$ [mm] is a depth of cut, $K_t$ [N/m²] is a cutting rigidity in a circumferential direction, and $K_r$ [%] is a specific cutting rigidity in a radial direction.

The cutting forces $F_x$ and $F_y$ change in accordance with an angle of rotation $\varphi$ [rad] of the tool T; therefore, the cutting forces $F_x$ and $F_y$ can be respectively obtained by integrating the cutting force $F_x$, $F_y$ between an angle $\varphi_{st}$ at which cutting is started and an angle $\varphi_{ex}$ at which the cutting is ended and calculating the mean value thereof. Further, the angle $\varphi_{st}$ and the angle $\varphi_{ex}$ can be geometrically determined based on a diameter D [mm] of the tool T, a width of cut Ae [mm], the feed direction, and whether the cutting is upper cut or down cut.

An eigenvalue $\Lambda$ of the above equations 1 and 2 is represented by the following equation 5:

$$\Lambda = -(a_1 \pm (a_1^2 - 4a_0)^{1/2})/2a_0, \quad \text{(Equation 5)}$$

where $a_0 = \phi_{xx}(i\omega_c)\phi_{yy}(i\omega_c)(\alpha_{xx}\alpha_{yy}-\alpha_{xy}\alpha_{yx})$, $a_1 = \alpha_{xx}\phi_{xx}(i\omega_c) + \alpha_{yy}\phi_{yy}(i\omega_c)$, $\phi_{xx}(i\omega_c) = 1/(m_x(-\omega_c^2 + 2i\zeta_x\omega_c\omega_x + \omega_x^2))$, $\phi_{yy}(i\omega_c) = 1/(m_y(-\omega_c^2 + 2i\zeta_y\omega_c\omega_y + \omega_y^2))$, $\alpha_{xx} = [(\cos 2\varphi_{ex} - 2K_r\varphi_{ex} + K_r \sin 2\varphi_{ex}) - (\cos 2\varphi_{st} - 2K_r\varphi_{st} + K_r \sin 2\varphi_{st})]/2$, $\alpha_{xy} = [(-\sin 2\varphi_{ex} - 2\varphi_{ex} + K_r \cos 2\varphi_{ex}) - (-\sin 2\varphi_{st} - 2\varphi_{st} + K_r \cos 2\varphi_{st})]/2$, $\alpha_{yx} = [(-\sin 2\varphi_{ex} + 2\varphi_{ex} + K_r \cos 2\varphi_{ex}) - (-\sin 2\varphi_{st} + 2\varphi_{st} + K_r \cos 2\varphi_{st})]/2$, and $\alpha_{yy} = [(-\cos 2\varphi_{ex} - 2K_r\varphi_{ex} - K_r \sin 2\varphi_{ex}) - (\cos 2\varphi_{st} - 2K_r\varphi_{st} - K_r \sin 2\varphi_{st})]/2$.

In these equations, $\omega_c$ is a frequency of chatter vibration.

When a real part and an imaginary part of the eigenvalue $\Lambda$ are represented by $\Lambda_R$ and $\Lambda_I$, respectively, a depth of cut $a_{plim}$ and a spindle rotation speed $n_{lim}$ at a stability limit are represented by the following equations 6 and 7, respectively:

$$a_{plim} = 2\pi\Lambda_R(1+(\Lambda_I/\Lambda_R)^2)/(NK_t); \text{ and} \quad \text{(Equation 6)}$$

$$n_{lim} = 60\omega_c/(N(2k\pi+\pi-2\tan^{-1}(\Lambda_I/\Lambda_R))). \quad \text{(Equation 7)}$$

In these equations, N is the number of edges of the tool T and k is an integer.

By calculating the limit depth of cut $a_{plim}$ and the spindle rotation speed $n_{lim}$ by the above equations 6 and 7 while changing the values of $\omega_c$ and k in the equations in a predetermined manner, a stability lobe as shown in FIG. 3 can be created.

Note that the natural frequencies $\omega_x$ and $\omega_y$ can be experimentally obtained through a striking test using a hammer, and the cutting rigidity $K_t$ and the specific cutting rigidity $K_r$ can be obtained through trial machining.

Further, the damping ratios $\zeta_x$ and $\zeta_y$ can be calculated, for example, by the following equations 8 and 9, respectively:

$$\zeta_x=(\omega_{1x}-\omega_{2x})/2\omega_x; \text{ and} \quad \text{(Equation 8)}$$

$$\zeta_y=(\omega_{1y}-\omega_{2y})/2\omega_y, \quad \text{(Equation 9)}$$

wherein $\omega_x$ is the natural frequency in the x-axis direction of the tool T and $\omega_y$ is the natural frequency in the y-axis direction of the tool T.

Figure 9:
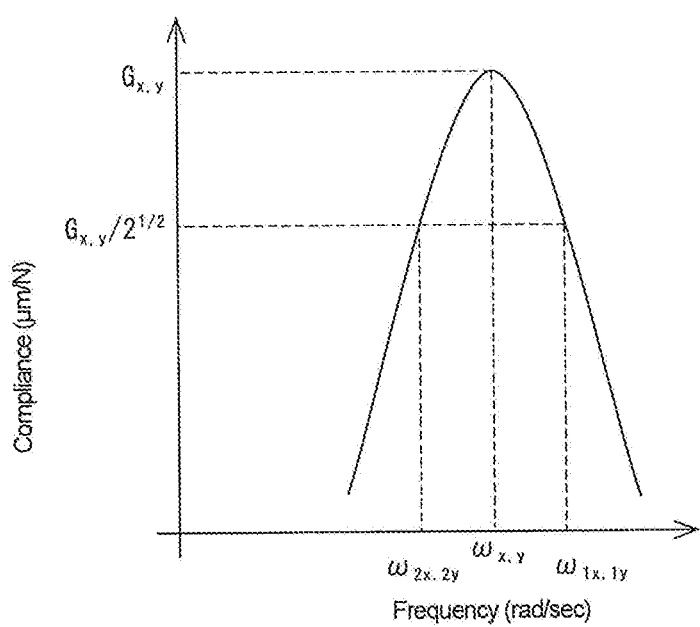
FIG. 9 is an illustration for explaining calculation of a damping ratio.

Note that, as shown in FIG. 9, $\omega_{1x}$ and $\omega_{2x}$ are frequencies corresponding to $G_x/2^{1/2}$ when the largest value of a compliance (displacement (=output)/cutting force (=input)) in the x-axis direction is $G_x$, and $\omega_{1y}$ and $\omega_{2y}$ are frequencies corresponding to $G_y/2^{1/2}$ when the largest value of a compliance in the y-axis direction is $G_y$, and the frequency when the compliance in the x-axis direction is the largest value $G_x$ and the frequency when the compliance in the y-axis direction is the largest value $G_y$ are the natural frequencies $\omega_x$ and $\omega_y$ of the tool T, respectively.

Further, the equivalent masses $m_x$ and $m_y$ can be calculated by the following equations 10 and 11, respectively:

$$m_x=1/(2G_x\zeta_x\omega_x^2); \text{ and} \quad \text{(Equation 10)}$$

$$m_y=1/(2G_y\zeta_y\omega_y^2). \quad \text{(Equation 11)}$$

Note that the stability lobe differs in accordance with tool type, tool material, and workpiece material; therefore, a stability lobe is obtained in advance with respect to each tool type, each tool material, and each workpiece material in the above-described manner, and the obtained stability lobes are stored in the stability lobe data storage 10 with respect to each tool type, each tool material, and each workpiece material.

The achievement degree display picture creator 3 is configured to receive, from the input device 8 and the input controller 7, selection signals for selecting a tool type, a tool material, and a workpiece material, a selection signal for selecting one from the evaluation items, and a signal relating to a required degree of achievement for the selected evaluation item. Note that these signals are input by an operator through the input device 8.

Upon receiving the selection signals and the signal relating to the required degree of achievement, the achievement degree display picture creator 3 refers to a data table corresponding to the selected tool type, tool material, and workpiece material from among the data tables stored in the achievement degree data storage 9, and refers to stability lobe data corresponding to the selected tool type, tool material, and workpiece material from among the data stored in the stability lobe data storage 10. Thereby, the achievement degree display picture creator 3 creates a display picture for displaying a set of machining conditions corresponding to the required degree of achievement for the selected evaluation item as well as the degrees of achievement of the evaluation items to be obtained under the set of machining conditions, and displays the created display picture on the display device 5 via the display controller 4.

Hereinafter, a mode of the creation of a display picture in the achievement degree display picture creator 3 and display of the display picture on the display device 5 will be described in detail.

First, by referring to the data table corresponding to the selected tool type, tool material, and workpiece material, the achievement degree display picture creator 3 recognizes a set of machining conditions corresponding to the required degree of achievement for the selected evaluation item. Further, by referring to the stability lobe data corresponding to the selected tool type, tool material, and workpiece material, the achievement degree display picture creator 3 examines whether the recognized set of machining conditions falls within the stable area limited by the stability lobe. In the case where the set of machining conditions falls within the stable area, the achievement degree display picture creator 3 recognizes the degrees of achievement of the evaluation items to be obtained under the set of machining conditions, by referring to the data table.

For example, in a case where the referred data table is the data table shown in FIG. 2, the selected evaluation item is "machining time", and the required degree of achievement therefor is "90", the achievement degree display picture creator 3 recognizes, as a set of machining conditions corresponding thereto, the set of machining conditions in which "feed rate" is "max", "cutting speed" is "max", "width of cut" is "middle", and "depth of cut" is "min", and reads out the degrees of achievement of the evaluation items corresponding to this set of machining conditions. Note that, in this case, the degree of achievement of "surface roughness" is "45", the degree of achievement of "tool life" is "22", the degree of achievement of "cutting efficiency" is "60", the degree of achievement of "residual stress" is "6", and the degree of achievement of "spindle motor load" is "8", and the degree of achievement of "feed motor load" is "6".

In contrast, in the case where the recognized set of machining conditions does not fall within the stable area limited by the stability lobe, the achievement degree display picture creator 3 selects a set of machining conditions which falls within the stable area, and reads out the degrees of achievement of the evaluation items corresponding to the selected set of machining conditions by referring to the data table. Note that, in changing the set of machining conditions, change is made to both of "cutting speed" and "depth of cut" or either one of them.

Figure 4:
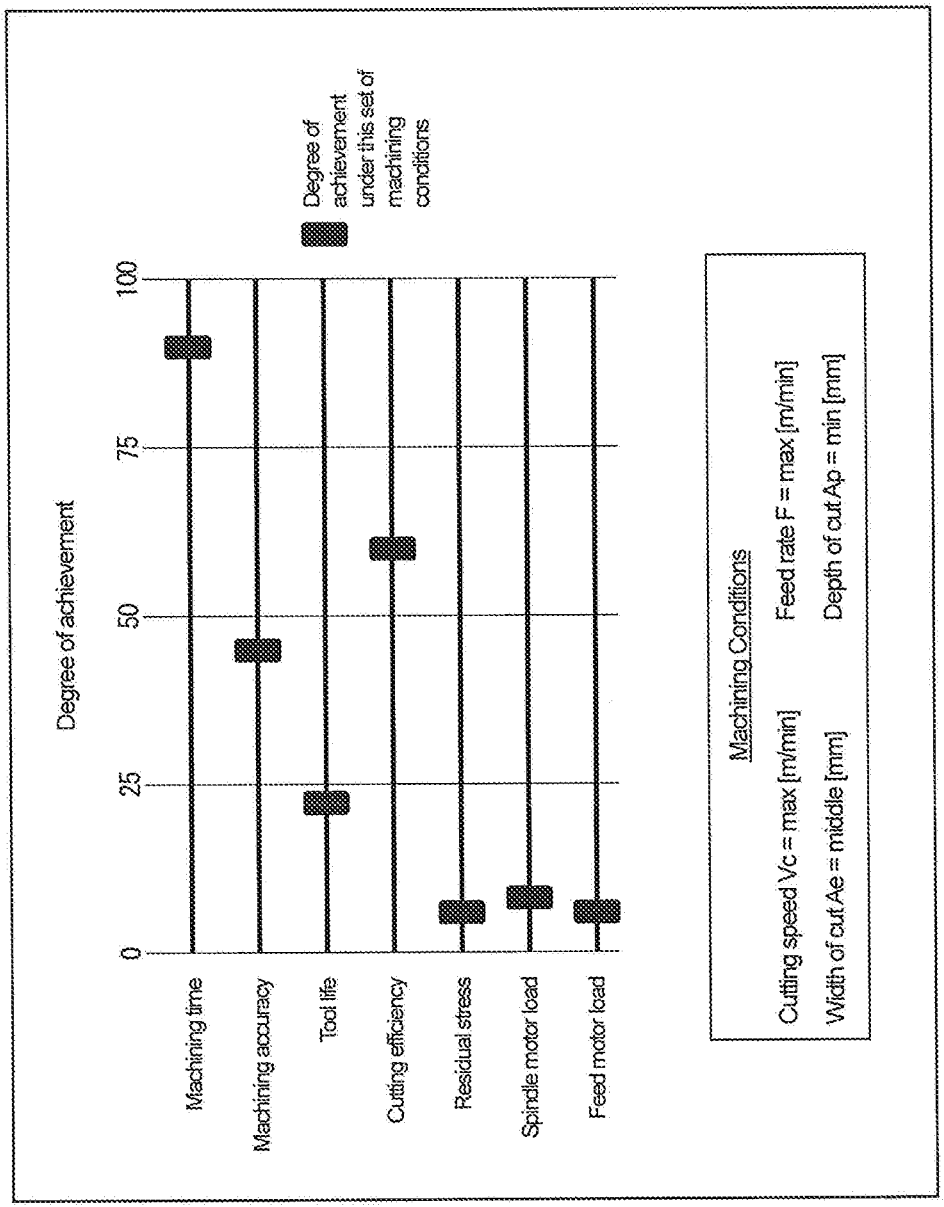
FIG. 4 is an illustration showing an example of a display picture displayed on a display device in the embodiment.

Subsequently, the achievement degree display picture creator 3 creates a display picture showing the read-out set of machining conditions and degrees of achievement of the evaluation items. In such a display picture, as shown in FIG. 4, the degrees of achievement of the evaluation items are shown by means of figures, and a column for showing the corresponding set of machining conditions by means of characters is provided below the figures representing the degrees of achievement.

The figures representing the degree of achievement of each evaluation item consist of an axial figure having a length corresponding to the range determined by the maximum and minimum values of the evaluation item, and an index figure (black rectangular figure) arranged on the axial figure at a length position corresponding to a proportion corresponding to the degree of achievement of the evaluation item. In this example, the axial figure for each evaluation item has a length defining the maximum value as level "100" and the minimum value as level "0", the axial figures have the same length. Further, at the left of each axial figure, the corresponding evaluation item is shown by means of characters. In FIG. 4, the set of machining conditions read out in the above-described manner, in which "feed rate" is "max", "cutting speed" is "max", "width of cut" is "middle", "depth of cut" is "min", is displayed, and the index figures for the case where the degree of achievement of "machining time" is "90", the degree of achievement of "surface roughness" is "45", the degree of achievement of "tool life" is "22", the degree of achievement of "cutting efficiency" is "60", the degree of achievement of "residual stress" is "6", the degree of achievement of "spindle motor load" is "8", and the degree of achievement of "feed motor load" is "6" are displayed.

Data relating to the display picture created by the achievement degree display picture creator 3 in the above-described manner is transmitted to the display controller 4, and the display picture is displayed on the display device 5 under control by the display controller 4.

As described above, with the machining state display apparatus 1 according to this embodiment, once an operator inputs a tool type, a tool material, and a workpiece material which he desires to be displayed, as well as an evaluation item to be noted and a required degree of achievement for the evaluation item, with respect to machining using the desired tool type, tool material, and workpiece material, a set of machining conditions which satisfies the required degree of achievement for the evaluation item to be noted is displayed and the degrees of achievement of the evaluation items to be obtained under the set of machining conditions are displayed by means of the figures. Therefore, the operator can instantaneously and intuitively recognize the degrees of achievement of the evaluation items. Further, the operator can recognize the degree of achievement of the evaluation item to be noted as well as the degrees of achievement of other evaluation items and can easily recognize a relationship between the evaluation items; therefore, the operator can easily recognize a set of machining conditions which provides such degrees of achievement.

Further, the operator can adjust the degrees of achievement of the evaluation items by adjusting the required degree of achievement that he inputs through the input device 8. Such adjustment allows the operator to easily recognize, for example, a set of machining conditions under which the degrees of achievement of the evaluation items are well-balanced or a set of machining conditions under which the degrees of achievement of the evaluation items are in his desired state. Further, since the evaluation items are related to machining efficiency, machining costs, and machining accuracy, adjusting the degrees of achievement of the evaluation items allows the operator to obtain a preferable set of machining conditions which comprehensively takes into account machining efficiency, machining costs, and machining accuracy.

Further, with this machining state display apparatus 1, in the case where the set of machining conditions corresponding to the required degree of achievement for the selected evaluation item does not fall within the stable area limited by the stability lobe, another set of machining conditions which falls within the stable area is selected, and the selected set of machining conditions and the degrees of achievement of the evaluation items corresponding to the selected set of machining conditions are displayed. Therefore, the operator can obtain a set of machining conditions which causes no regenerative chatter, without being required to perform a special operation.

Note that, in the machining state display apparatus 1 according to this embodiment, the input device 8 may be configured to be able to, in the state where a picture showing the degrees of achievement has been displayed on the display device 5 in the above-described manner, via the input controller 7 and the display controller 4, input a selection signal for selecting one from the index figures for the evaluation items displayed on the display device 5 and input a signal for sliding the selected index figure in a longitudinal direction of the axial figure corresponding thereto.

In such a case, the display controller 4 is configured to, when the selection signal and the sliding signal are input from the input device 8 via the input controller 7, recognize the evaluation item corresponding to the selection signal and transmit a signal relating to the evaluation item to the input controller 8. Further, the display controller 4 is configured to slide the index figure displayed on the display device 5 in accordance with the sliding signal, and recognize a degree of achievement corresponding to a position at which the index figure is stopped and transmit a signal relating to the recognized degree of achievement to the input controller 7. The input controller 7 is configured to transmit, to the achievement degree display picture creator 3, the signal relating to the evaluation item (i.e., signal relating to the changed selected evaluation item) and signal relating to the degree of achievement (signal relating to the changed required degree of achievement) transmitted from the display controller 4.

Upon receiving the signal relating to the changed selected evaluation item and the signal relating to the changed required degree of achievement from the input controller 7 in the above-described manner, the achievement degree display picture creator 3 creates an updated display picture by performing the above-described steps again, and transmits data relating to the updated display picture to the display controller 4 to display the updated display picture on the display device 5 under control by the display controller 4.

With the thus-configured machining state display apparatus 1, a selection signal is input when an operator selects one from the index figures for the evaluation items displayed on the display device 5 through the input device 8, and a required degree of achievement is input when the operator slides the selected index figure in the longitudinal direction of the axial figure corresponding thereto. Therefore, the operator can easily adjust the required degree of achievement to be input and easily adjust the degrees of achievement of the evaluation items.

Further, in the machining state display apparatus 1 according to this embodiment, the achievement degree display picture creator 3 may be configured to, in a case where two or more sets of machining conditions exist which satisfy the required degree of achievement for the selected evaluation item input from the input controller 7, recognize an optimum set of machining conditions under which the degree of achievement of another evaluation item (evaluation item different from the selected evaluation item) of high priority, which is previously determined in relation to the selected evaluation item, is greatest, then recognize the degrees of achievement of other evaluation items to be obtained under the optimum set of machining conditions, and create a display picture as described above.

Further, in such a case, the achievement degree display picture creator 3 may be configured to, in the display picture, with respect to a non-target degree of achievement of the evaluation items other than the degrees of achievement corresponding to the index figures of the degrees of achievement of the evaluation items to be obtained under the existing sets of machining conditions, in other words, with respect to each of the degrees of achievement of the evaluation items to be obtained under the existing sets of machining conditions other than the optimum set of machining conditions, arrange a regional figure on the axial figure corresponding thereto, the regional figure including a length position corresponding to a proportion corresponding to the degree of achievement and connecting to the index figure.

For example, in FIG. 2, in a case where the selected evaluation item is "machining time" and the required degree of achievement is "94", two sets of machining conditions satisfy the required degree of achievement: a first set of machining conditions in which "feed rate" is "max", "cutting speed" is "max", "width of cut" is "max", and "depth of cut" is "min", and a second set of machining conditions in which "feed rate" is "max", "cutting speed" is "max", "width of cut" is "middle", and "depth of cut" is "middle".

Figure 5:
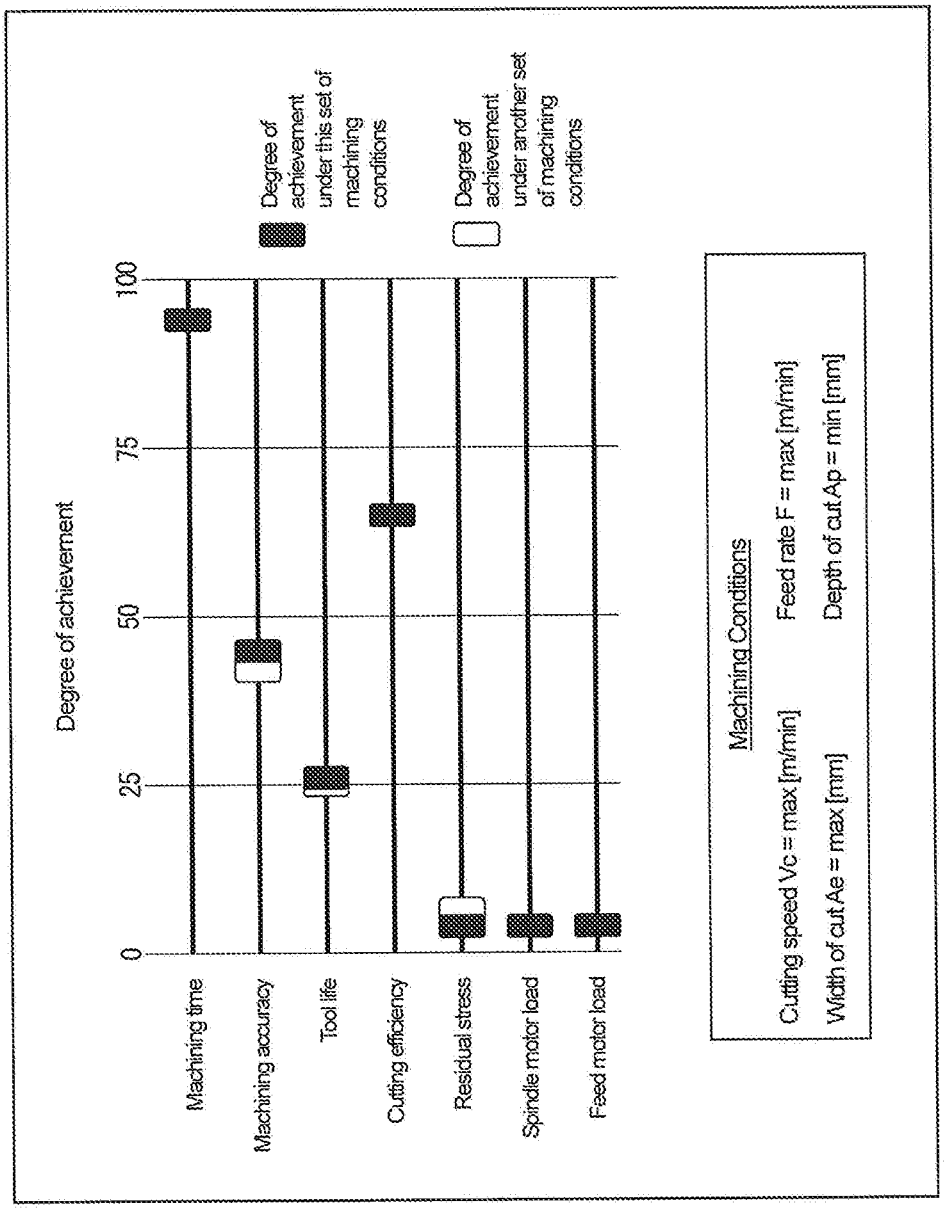
FIG. 5 is an illustration showing an example of the display picture displayed on the display device in the embodiment.

In this case, the achievement degree display picture creator 3 selects the set of machining conditions under which the degree of achievement of the predetermined high-priority evaluation item, for example, "surface roughness", is greater, i.e., the first set of machining conditions under which the degree of achievement of "surface roughness" is "45", reads out the degrees of achievement of the other evaluation items to be obtained under the first set of machining conditions, and creates a display picture as described above. Further, in the case where there is an evaluation item having a different degree of achievement under the second set of machining conditions from the one under the first set of machining conditions, the achievement degree display picture creator 3 arranges, in the display picture, with respect to the evaluation item, a regional figure on the axial figure corresponding thereto, the regional figure including a length position corresponding to a proportion corresponding to the degree of achievement to be obtained under the second set of machining conditions (non-target degree of achievement) and connecting to the index figure. In the example shown in FIG. 2, the degree of achievement "42" of "surface roughness" and the degree of achievement "25" of "tool life" are non-target degrees of achievement. A display picture created in this manner is shown in FIG. 5. In FIG. 5, the regional figures are shown by white rectangular figures.

With the thus-configured machining state display apparatus 1, in the case where there are two or more sets of machining conditions corresponding to the required degree of achievement for the selected evaluation item, with respect to each of the evaluation items, the degrees of achievement under the sets of machining conditions are shown by the index figure and the regional figure connecting thereto. Therefore, the operator can recognize, which respect to each evaluation item, the degree of achievement corresponding to the index figure as well as another attainable degree of achievement. Further, because the operator can obtain such recognition, he can easily obtain a set of machining conditions which provides preferable degrees of achievement for the evaluation items, that is, a preferable set of machining conditions which comprehensively takes into account machining efficiency, machining costs, and machining accuracy.

Further, in the machining state display apparatus 1 according to this embodiment, the achievement degree display picture creator 3 may be configured to, in the above-mentioned case where two or more sets of machining conditions exist which satisfy the required degree of achievement for the selected evaluation item, if still another evaluation item that is different from the high-priority evaluation item has a greater degree of achievement under a different set of machining conditions from the optimum set of machining conditions than under the optimum set of machining conditions, with respect to the still another evaluation item, display a figure representing the degree of achievement to be obtained under the different set of machining conditions and a figure representing the degree of achievement to be obtained under the optimum set of machining conditions with the figures associated with each other.

Figure 6:
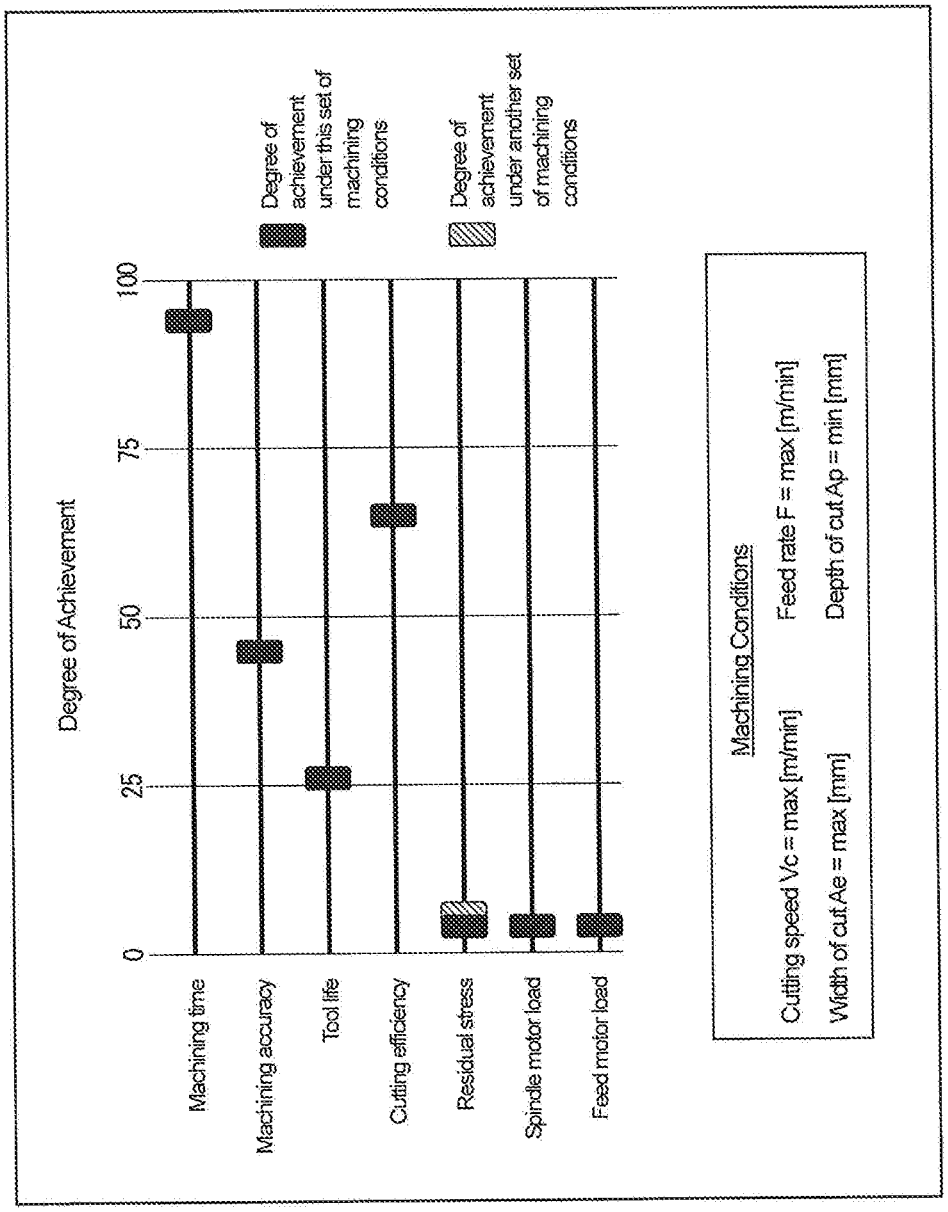
FIG. 6 is an illustration showing an example of the display picture displayed on the display device in the embodiment.

For example, in FIG. 2, similarly to the above, in the case where the selected evaluation item is "machining time" and the required degree of achievement therefor is "94", two sets of machining conditions, i.e., the first set of machining conditions and the second set of machining conditions, satisfy the required degree of achievement, and the first set of machining conditions under which the degree of achievement of "surface roughness" that is the high-priority evaluation item is greater is selected as a set of machining conditions to be applied. Thereafter, the achievement degree display picture creator 3 reads out the degrees of achievement of the evaluation items to be obtained under the first set of machining conditions and creates a display picture therefor. In this process, with respect to an evaluation item having a greater degree of achievement under the second set of machining conditions than under the first set of machining conditions, the achievement degree display picture creator 3 designates the degree of achievement to be obtained under the second set of machining conditions as a non-target degree of achievement, and arranges a reference index figure as an index for reference on the axial figure corresponding thereto at a length position corresponding to a proportion corresponding to the non-target degree of achievement. The degree of achievement of "residual stress" to be obtained under the second set of machining conditions is "6", which is greater than the degree of achievement "4" thereof to be obtained under the first set of machining conditions. In this case, as shown in FIG. 6, with respect to "residual stress" a reference index figure corresponding to the degree of achievement "6" to be obtained under the second set of machining conditions is shown together with the index figure corresponding to the degree of achievement "4" to be obtained under the first set of machining conditions. Note that, in FIG. 6, the reference index figure is shown by a hatched rectangular figure.

With the thus-configured machining state display apparatus 1, in the case where the degree of achievement of still another evaluation item that is different from the high-priority evaluation item is greater under a different set of machining conditions from the optimum set of machining conditions than under the optimum set of machining conditions, with respect to the still another evaluation item, a figure representing the degree of achievement to be obtained under the different set of machining conditions and a figure representing the degree of achievement to be obtained under the optimum set of machining conditions are displayed in association with each other. Therefore, by referring to the figures, the operator can easily recognize not only a set of machining conditions prioritizing the predetermined high-priority evaluation item, but also whether there is another preferable set of machining conditions, which allows the operator to obtain a more preferable set of machining conditions.

Figure 7:
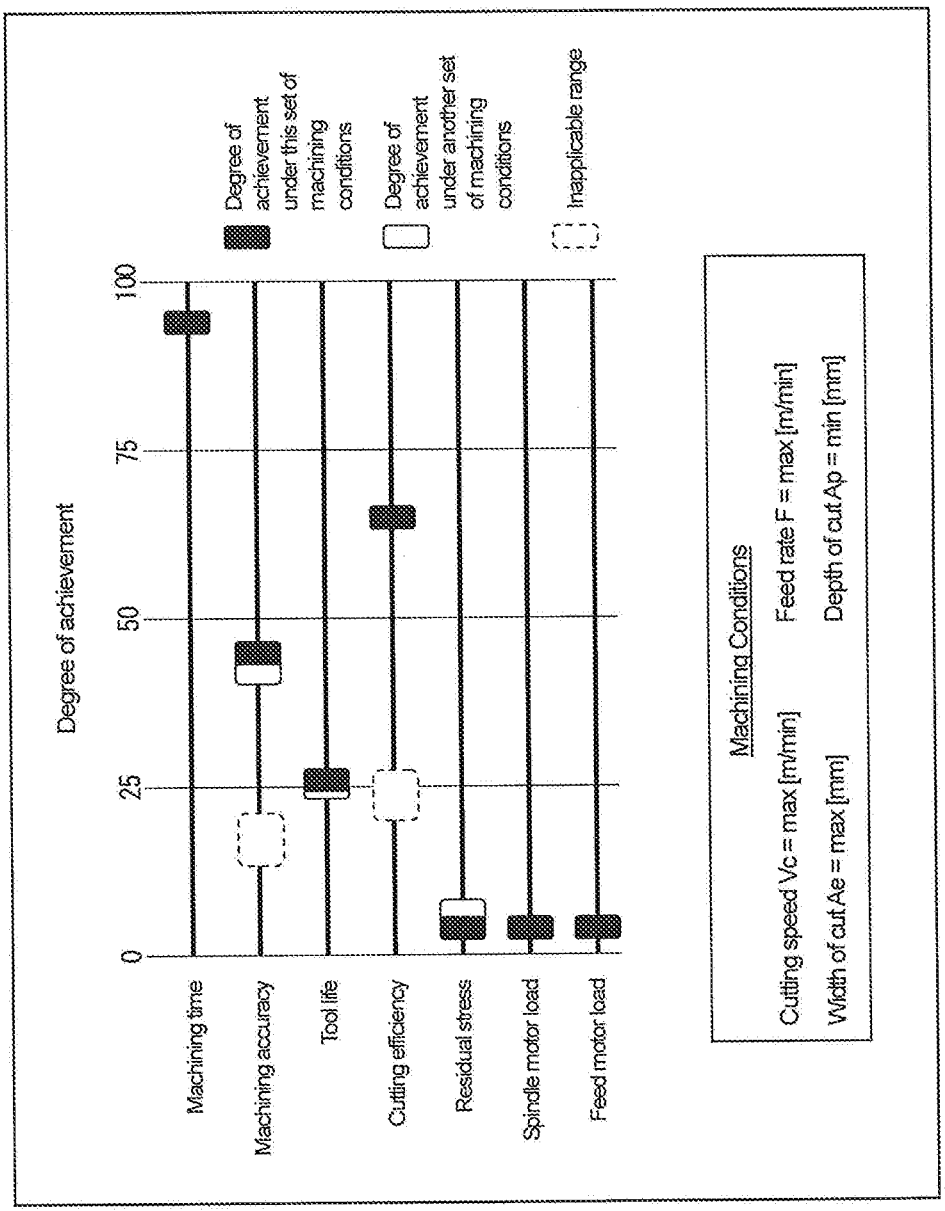
FIG. 7 is an illustration showing an example of the display picture displayed on the display device in the embodiment.

Further, in the machining state display apparatus 1 according to this embodiment, the achievement degree display picture creator 3 may be configured, when creating the display picture, recognize an unstable set of machining conditions which falls within an unstable area limited by the stability lobe based on the selected stability lobe data and achievement degree data, examine, based on the recognized unstable set of machining conditions, with respect to each of the evaluation items, whether an inapplicable degree of achievement exists, and, in the case where an inapplicable degree of achievement exits, arrange a figure corresponding to the inapplicable degree of achievement on the axial figure for the evaluation item corresponding thereto. An example of such a display picture is shown in FIG. 7. In FIG. 7, white rectangular figures sounded by dashed lines represent inapplicable ranges. Note that, as a matter of course, the embodiments shown in FIGS. 4 and 6 may be configured to display such a figure corresponding to an inapplicable degree of achievement.

With this machining state display apparatus 1, the operator can easily recognize whether the displayed degrees of achievement of the evaluation items are inapplicable. Further, under such recognition, the operator can select a set of machining conditions which does not provide inapplicable degrees of achievement for the evaluation items, by adjusting the required degree of achievement for the selected evaluation item as appropriate.

Hereinbefore, a specific embodiment of the present invention has been described. However, the present invention is not limited thereto and may be implemented in other modes.

Although the achievement degree display picture creator 3 in the above embodiment is configured to create a display picture in which the degrees of achievement are displayed by means of figures, the achievement degree display picture creator 3 may be configured to create a display picture in which the degrees of achievement are displayed by means of characters. In such a case, also as for the above-described regional figure, reference index figure, and figure corresponding to the inapplicable degree of achievement, it is preferable that the degree of achievement, range, or the like corresponding thereto is displayed by means of characters with respect to each evaluation item.

REFERENCE SIGNS LIST

1 Machining state display apparatus
2 Display part
3 Achievement degree display picture creator
4 Display controller
5 Display device
6 Input part
7 Input controller
8 Input device
9 Achievement degree data storage
10 Stability lobe data storage
11 Computing device

The invention claimed is:

1. A machining state display apparatus, comprising:
an achievement degree data storage storing machining condition data relating to each of a plurality of predetermined sets of machining conditions and achievement degree data relating to degrees of achievement of a plurality of evaluation items on machine-tool machining to be obtained in machining under each of the plurality of sets of machining conditions with the machining condition data and the achievement degree data associated with each other, the plurality of evaluation items including at least one selected from among machining time, surface roughness, tool life, cutting efficiency, residual stress, spindle motor load, and feed motor load, the achievement degree data indicating the degree of achievement of each of the evaluation items within a range determined by attainable maximum and minimum values of the evaluation item;
a display device having a display;
an achievement degree display picture creator creating an achievement degree display picture for displaying, on the display, a set of machining conditions and the degrees of achievement of the evaluation items corresponding to the set of machining conditions by referring to the machining condition data and achievement degree data stored in the achievement degree data storage;
a display controller displaying the achievement degree display picture created by the achievement degree display picture creator on the display of the display device;
an input device inputting a selection signal for selecting one from the plurality of evaluation items and a required degree of achievement for the selected evaluation item; and
an input controller transmitting the selection signal and required degree of achievement input from the input device to the achievement degree display picture creator,
the achievement degree display picture creator being configured to, upon receipt of the selection signal and the required degree of achievement from the input controller, recognize, based on the selected evaluation item and the required degree of achievement, a set of machining conditions corresponding to the required degree of achievement for the selected evaluation item as well as the degrees of achievement of other evaluation items to be obtained under the set of machining conditions by referring to the achievement degree data and machining condition data stored in the achievement degree data storage, and create, as the achievement degree display picture, a display picture displaying the degree of achievement of the received evaluation item and the recognized degrees of achievement of the other evaluation items on evaluation-item basis.

2. The machining state display apparatus according to claim 1, wherein:
the achievement degree display picture creator is configured to,
in a case where, as a result of referring to the achievement degree data stored in the achievement degree data storage, there are two or more sets of machining conditions corresponding to the required degree of achievement for the selected evaluation item,
recognize an optimum set of machining conditions under which the degree of achievement of a high-priority evaluation item of the other evaluation items is greatest, the high-priority evaluation item being previously determined in relation to the selected evaluation item,
subsequently, recognize the degrees of achievement of the other evaluation items to be obtained under the optimum set of machining conditions, and
create, as the achievement degree display picture, a display picture displaying the degree of achievement of the input evaluation item and the recognized degrees of achievement of the other evaluation items on evaluation-item basis and displaying the recognized optimum set of machining conditions.

3. The machining state display apparatus according to claim 2, wherein:
the achievement degree display picture creator is configured to create, as the achievement degree display picture, a display picture displaying the degree of achievement of each of the evaluation items by means of figures, the figures including an axial figure having a length corresponding to the range determined by the maximum and minimum values of the evaluation item, and an index figure arranged on the axial figure at a length position corresponding to a proportion corresponding to the degree of achievement; and the achievement degree display picture creator is further configured to, in a case where, as a result of referring to the achievement degree data stored in the achievement degree data storage, the degree of achievement of still another evaluation item different from the high-priority evaluation item is greater under a different set of machining conditions from the optimum set of machining conditions than under the optimum set of machining conditions, create, as the achievement degree display picture, a display picture displaying, with respect to the still another evaluation item, a figure representing the degree of achievement to be obtained under the different set of machining conditions and a figure representing the degree of achievement to be obtained under the optimum set of machining conditions with these figures associated with each other.

4. The machining state display apparatus according to claim 3, wherein:

the input device is configured to be able to, via the input controller, input a selection signal for selecting one from the index figures for the evaluation items displayed on the display and input a sliding signal for sliding the selected index figure in a longitudinal direction of the axial figure corresponding thereto; and the display controller is configured to, when the selection signal and the sliding signal are input from the input device via the input controller, recognize the evaluation item corresponding to the selection signal and slide the index figure displayed on the display in accordance with the sliding signal, recognize a required degree of achievement based on a position at which the index figure is stopped, and input the recognized required degree of achievement to the input controller.

5. The machining state display apparatus according to claim 3, wherein:

the machining state display apparatus further comprises a stability lobe data storage storing stability lobe data relating to regenerative chatter of a tool in a correlation between relative rotation speed between the tool and an object to be machined and cutting amount of the tool; and the achievement degree display picture creator is configured to, based on the stability lobe data stored in the stability lobe data storage, examine whether the set of machining conditions corresponding to the required degree of achievement falls within a stable area limited by the stability lobe, in a case where the set of machining conditions corresponding to the required degree of achievement falls within the stable area, create, as the achievement degree display picture, a display picture displaying the set of machining conditions and the degrees of achievement of the evaluation items to be obtained under the set of machining conditions, in a case where the set of machining conditions corresponding to the required degree of achievement does not fall within the stable area, select a set of machining conditions falling within the stable area and recognize the degrees of achievement of the evaluation items corresponding to the selected set of machining conditions by referring to the data stored in the achievement degree data storage, and create, as the achievement degree display picture, a display picture displaying the selected set of machining conditions and the recognized degrees of achievement of the evaluation items.

6. The machining state display apparatus according to claim 2, wherein the achievement degree display picture creator is configured to create, as the achievement degree display picture, a display picture displaying the degree of achievement of each of the evaluation items by means of figures, the figures consisting of an axial figure having a length corresponding to the range determined by the maximum and minimum values of the evaluation item, and an index figure arranged on the axial figure at a length position corresponding to a proportion corresponding to the degree of achievement.

7. The machining state display apparatus according to claim 2, wherein:

the achievement degree display picture creator is configured to create, as the achievement degree display picture, a display picture displaying the degree of achievement of each of the evaluation items by means of figures, the figures including an axial figure having a length corresponding to the range determined by the maximum and minimum values of the evaluation item, and an index figure arranged on the axial figure at a length position corresponding to a proportion corresponding to the degree of achievement; and the achievement degree display picture creator is further configured to, in a case where, as a result of referring to the achievement degree data stored in the achievement degree data storage, there are two or more sets of machining conditions corresponding to the required degree of achievement for the selected evaluation item, create, as the achievement degree display picture, a display picture displaying, with respect to a non-target degree of achievement other than the degrees of achievement corresponding to the index figures of the degrees of achievement of the evaluation items to be obtained under the two or more sets of machining conditions, a regional figure arranged on the axial figure, the regional figure including a length position corresponding to a proportion corresponding to the non-target degree of achievement and connecting to the index figure.

8. The machining state display apparatus according to claim 2, wherein:

the machining state display apparatus further comprises a stability lobe data storage storing stability lobe data relating to regenerative chatter of a tool in a correlation between relative rotation speed between the tool and an object to be machined and cutting amount of the tool; and the achievement degree display picture creator is configured to, based on the stability lobe data stored in the stability lobe data storage, examine whether the set of machining conditions corresponding to the required degree of achievement falls within a stable area limited by the stability lobe, in a case where the set of machining conditions corresponding to the required degree of achievement falls within the stable area, create, as the achievement degree display picture, a display picture displaying the set of machining conditions and the degrees of achievement of the evaluation items to be obtained under the set of machining conditions, in a case where the set of machining conditions corresponding to the required degree of achievement does not fall within the stable area, select a set of machining conditions falling within the stable area and recognize the degrees of achievement of the evaluation items corresponding to the selected set of machining conditions by referring to the data stored in the achievement degree data storage, and create, as the achievement degree display picture, a display picture displaying the selected set of machining conditions and the recognized degrees of achievement of the evaluation items.

9. The machining state display apparatus according to claim 2, wherein:
the machining state display apparatus further comprises a stability lobe data storage storing stability lobe data relating to regenerative chatter of a tool in a correlation between relative rotation speed between the tool and an object to be machined and cutting amount of the tool; and
the achievement degree display picture creator is configured to,
based on the stability lobe data stored in the stability lobe data storage and the data stored in the achievement degree data storage, recognize an unstable set of machining conditions falling within an unstable area limited by the stability lobe,
based on the recognized unstable set of machining conditions, with respect to each of the evaluation items, examine whether an inapplicable degree of achievement exists, and
in a case where an inapplicable degree of achievement exists, create, as the achievement degree display picture, a display picture displaying the inapplicable degree of achievement with respect to the evaluation item corresponding thereto.

10. The machining state display apparatus according to claim 1, wherein the achievement degree display picture creator is configured to create, as the achievement degree display picture, a display picture displaying the degree of achievement of each of the evaluation items by means of figures, the figures consisting of an axial figure having a length corresponding to the range determined by the maximum and minimum values of the evaluation item, and an index figure arranged on the axial figure at a length position corresponding to a proportion corresponding to the degree of achievement.

11. The machining state display apparatus according to claim 10, wherein:
the input device is configured to be able to, via the input controller, input a selection signal for selecting one from the index figures for the evaluation items displayed on the display and input a sliding signal for sliding the selected index figure in a longitudinal direction of the axial figure corresponding thereto; and
the display controller is configured to, when the selection signal and the sliding signal are input from the input device via the input controller, recognize the evaluation item corresponding to the selection signal and slide the index figure displayed on the display in accordance with the sliding signal, recognize a required degree of achievement based on a position at which the index figure is stopped, and input the recognized required degree of achievement to the input controller.

12. The machining state display apparatus according to claim 11, wherein:
the machining state display apparatus further comprises a stability lobe data storage storing stability lobe data relating to regenerative chatter of a tool in a correlation between relative rotation speed between the tool and an object to be machined and cutting amount of the tool; and
the achievement degree display picture creator is configured to,
based on the stability lobe data stored in the stability lobe data storage, examine whether the set of machining conditions corresponding to the required degree of achievement falls within a stable area limited by the stability lobe,
in a case where the set of machining conditions corresponding to the required degree of achievement falls within the stable area, create, as the achievement degree display picture, a display picture displaying the set of machining conditions and the degrees of achievement of the evaluation items to be obtained under the set of machining conditions,
in a case where the set of machining conditions corresponding to the required degree of achievement does not fall within the stable area, select a set of machining conditions falling within the stable area and recognize the degrees of achievement of the evaluation items corresponding to the selected set of machining conditions by referring to the data stored in the achievement degree data storage, and create, as the achievement degree display picture, a display picture displaying the selected set of machining conditions and the recognized degrees of achievement of the evaluation items.

13. The machining state display apparatus according to claim 10, wherein:
the machining state display apparatus further comprises a stability lobe data storage storing stability lobe data relating to regenerative chatter of a tool in a relationship between relative rotation speed between the tool and an object to be machined and cutting amount of the tool; and
the achievement degree display picture creator is configured to,
based on the stability lobe data stored in the stability lobe data storage and the data stored in the achievement degree data storage, recognize an unstable set of machining conditions falling within an unstable area limited by the stability lobe,
based on the recognized unstable set of machining conditions, with respect to each of the evaluation items, examine whether an inapplicable degree of achievement exists, and
in a case where an inapplicable degree of achievement exists, create, as the achievement degree display picture, a display picture displaying a figure corresponding to the inapplicable degree of achievement, with the figure arranged on the axial figure for the evaluation item corresponding thereto.

14. The machining state display apparatus according to claim 1, wherein:
the achievement degree display picture creator is configured to create, as the achievement degree display picture, a display picture displaying the degree of achievement of each of the evaluation items by means of figures, the figures including an axial figure having a length corresponding to the range determined by the maximum and minimum values of the evaluation item, and an index figure arranged on the axial figure at a length position corresponding to a proportion corresponding to the degree of achievement; and the achievement degree display picture creator is further configured to, in a case where, as a result of referring to the achievement degree data stored in the achievement degree data storage, there are two or more sets of machining conditions corresponding to the required degree of achievement for the selected evaluation item, create, as the achievement degree display picture, a display picture displaying, with respect to a non-target degree of achievement other than the degrees of achievement corresponding to the index figures of the degrees of achievement of the evaluation items to be obtained under the two or more sets of machining conditions, a regional figure arranged on the axial figure, the regional figure including a length position corresponding to a proportion corresponding to the non-target degree of achievement and connecting to the index figure.

15. The machining state display apparatus according to claim 10, wherein:

the machining state display apparatus further comprises a stability lobe data storage storing stability lobe data relating to regenerative chatter of a tool in a correlation between relative rotation speed between the tool and an object to be machined and cutting amount of the tool; and the achievement degree display picture creator is configured to, based on the stability lobe data stored in the stability lobe data storage, examine whether the set of machining conditions corresponding to the required degree of achievement falls within a stable area limited by the stability lobe, in a case where the set of machining conditions corresponding to the required degree of achievement falls within the stable area, create, as the achievement degree display picture, a display picture displaying the set of machining conditions and the degrees of achievement of the evaluation items to be obtained under the set of machining conditions, in a case where the set of machining conditions corresponding to the required degree of achievement does not fall within the stable area, select a set of machining conditions falling within the stable area and recognize the degrees of achievement of the evaluation items corresponding to the selected set of machining conditions by referring to the data stored in the achievement degree data storage, and create, as the achievement degree display picture, a display picture displaying the selected set of machining conditions and the recognized degrees of achievement of the evaluation items.

16. The machining state display apparatus according to claim 14, wherein:

the input device is configured to be able to, via the input controller, input a selection signal for selecting one from the index figures for the evaluation items displayed on the display and input a sliding signal for sliding the selected index figure in a longitudinal direction of the axial figure corresponding thereto; and the display controller is configured to, when the selection signal and the sliding signal are input from the input device via the input controller, recognize the evaluation item corresponding to the selection signal and slide the index figure displayed on the display in accordance with the sliding signal, recognize a required degree of achievement based on a position at which the index figure is stopped, and input the recognized required degree of achievement to the input controller.

17. The machining state display apparatus according to claim 14, wherein:

the machining state display apparatus further comprises a stability lobe data storage storing stability lobe data relating to regenerative chatter of a tool in a correlation between relative rotation speed between the tool and an object to be machined and cutting amount of the tool; and the achievement degree display picture creator is configured to, based on the stability lobe data stored in the stability lobe data storage, examine whether the set of machining conditions corresponding to the required degree of achievement falls within a stable area limited by the stability lobe, in a case where the set of machining conditions corresponding to the required degree of achievement falls within the stable area, create, as the achievement degree display picture, a display picture displaying the set of machining conditions and the degrees of achievement of the evaluation items to be obtained under the set of machining conditions, in a case where the set of machining conditions corresponding to the required degree of achievement does not fall within the stable area, select a set of machining conditions falling within the stable area and recognize the degrees of achievement of the evaluation items corresponding to the selected set of machining conditions by referring to the data stored in the achievement degree data storage, and create, as the achievement degree display picture, a display picture displaying the selected set of machining conditions and the recognized degrees of achievement of the evaluation items.

18. The machining state display apparatus according to claim 14, wherein:

the machining state display apparatus further comprises a stability lobe data storage storing stability lobe data relating to regenerative chatter of a tool in a relationship between relative rotation speed between the tool and an object to be machined and cutting amount of the tool; and the achievement degree display picture creator is configured to, based on the stability lobe data stored in the stability lobe data storage and the data stored in the achievement degree data storage, recognize an unstable set of machining conditions falling within an unstable area limited by the stability lobe, based on the recognized unstable set of machining conditions, with respect to each of the evaluation items, examine whether an inapplicable degree of achievement exists, and in a case where an inapplicable degree of achievement exists, create, as the achievement degree display picture, a display picture displaying a figure corresponding to the inapplicable degree of achievement, with the figure arranged on the axial figure for the evaluation item corresponding thereto.

19. The machining state display apparatus according to claim 1, wherein:

the machining state display apparatus further comprises a stability lobe data storage storing stability lobe data relating to regenerative chatter of a tool in a correlation between relative rotation speed between the tool and an object to be machined and cutting amount of the tool; and the achievement degree display picture creator is configured to, based on the stability lobe data stored in the stability lobe data storage, examine whether the set of machining conditions corresponding to the required degree of achievement falls within a stable area limited by the stability lobe, in a case where the set of machining conditions corresponding to the required degree of achievement falls within the stable area, create, as the achievement degree display picture, a display picture displaying the set of machining conditions and the degrees of achievement of the evaluation items to be obtained under the set of machining conditions, in a case where the set of machining conditions corresponding to the required degree of achievement does not fall within the stable area, select a set of machining conditions falling within the stable area and recognize the degrees of achievement of the evaluation items corresponding to the selected set of machining conditions by referring to the data stored in the achievement degree data storage, and create, as the achievement degree display picture, a display picture displaying the selected set of machining conditions and the recognized degrees of achievement of the evaluation items.

20. The machining state display apparatus according to claim 1, wherein:

the machining state display apparatus further comprises a stability lobe data storage storing stability lobe data relating to regenerative chatter of a tool in a correlation between relative rotation speed between the tool and an object to be machined and cutting amount of the tool; and the achievement degree display picture creator is configured to, based on the stability lobe data stored in the stability lobe data storage and the data stored in the achievement degree data storage, recognize an unstable set of machining conditions falling within an unstable area limited by the stability lobe, based on the recognized unstable set of machining conditions, with respect to each of the evaluation items, examine whether an inapplicable degree of achievement exists, and in a case where an inapplicable degree of achievement exists, create, as the achievement degree display picture, a display picture displaying the inapplicable degree of achievement with respect to the evaluation item corresponding thereto.

* * * * *